UNITED STATES PATENT OFFICE.

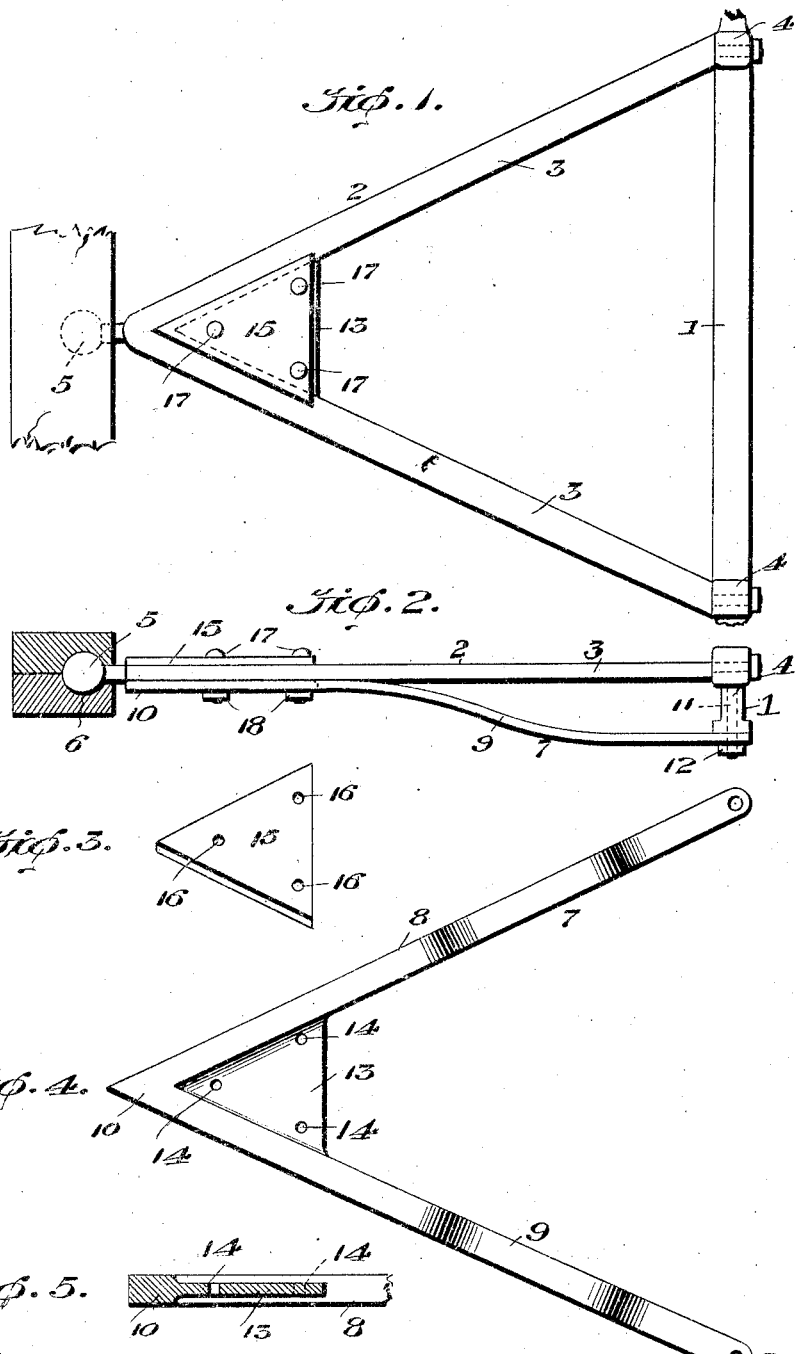

THOMAS E. CURRY, OF MOBILE, ALABAMA.

RADIUS-ROD.

1,362,681.   Specification of Letters Patent.   Patented Dec. 21, 1920.

Application filed May 21, 1920. Serial No. 383,136.

*To all whom it may concern:*

Be it known that I, THOMAS E. CURRY, residing at Mobile, in the county of Mobile and State of Alabama, a citizen of the United States, have invented certain new and useful Improvements in Radius-Rods; and I do hereby declare the following to be a full, clear, and exact description of the invention, such as will enable others skilled in the art to which it pertains to make and use the same.

My invention relates to improvements in radius rods for all self propelled vehicles, but is more particularly for use in connection with the well known type of Ford automobile or car.

The object of the invention is to provide means for bracing, reinforcing and adding strength, firmness and rigidity to the radius rods now in common use of automobiles and preventing them from buckling, breaking or being bent out of shape.

A further object is to provide means for reinforcing radius rods which is simple, inexpensive, durable and strong in construction, economical to manufacture and which will stand the test under the very severe and continual strain which every automobile has to undergo, and is easy to apply or install.

A further object is to provide means for reinforcing radius rods without altering or interfering with the original rod.

The invention consists in the several features and in the construction, combination and arrangement of such features as more fully hereinafter described and claimed.

Referring to the drawings:—

Figure 1 is a top plan view of a radius rod showing my invention applied thereto.

Fig. 2 is a side view, partly in section.

Fig. 3 is a detail view in perspective of the detachable plate.

Fig. 4 is a detail view of the auxiliary radius rod with the integral plate or web.

Fig. 5 is a detail sectional view of the plate or web of the auxiliary radius rod.

In the drawings in which like reference characters denote like parts throughout the several views, 1 represents the front axle of a Ford automobile and 2 the usual or well known triangular or V-shaped radius rod having arms 3 adapted to have their outer ends secured to the top of the axle 1 by means of suitable bolts 4 passing therethrough and provided at the inner end with a ball 5 which is adapted to be seated in and supported by a socket 6 formed on the automobile frame, the ball and socket constituting a ball and socket joint.

The auxiliary radius rod 7 constructed in accordance with my invention is made in one piece of material and is V-shaped and comprises radiating arms 8 and 9, which converge and intersect or meet at the point 10 at their inner ends, and their outer ends are secured to the underside of the axle 1 by means of the bolts 4, which pass through apertures 11 therein, and nuts 12 which when screwed up tightly on the bolts hold the outer ends of the arms 8 and 9 securely in place.

A preferably triangular shaped plate or web 13 is provided at the intersection of the arms 8 and 9 of the auxiliary radius rod 7, with which it is formed in one piece or is an integral part therewith, for the purpose of reinforcing the auxiliary radius rod by adding strength and rigidity at its weakest point, and thereby entirely eliminating breakage or reducing the same to a minimum degree and the above named triangular shaped plate or web is provided with a plurality of bolt holes 14, preferably three in number, one being situated at each corner. The triangular shaped plate or web 13 may if desired be welded or brazed to the auxiliary radius rod after the same has been manufactured instead of being formed integral therewith during the process of manufacture of the same.

For the purpose of securing the inner ends of the auxiliary radius rod and the original radius rod 2 a preferably triangular shaped detachable plate 15 is provided, slightly larger than the integral plate or web 13, having a plurality of bolt holes 16 which are adapted to be placed in vertical alinement with the bolt holes 14 of the plate or web 13.

The detachable plate is adapted to be placed over and have its edges rest on the upper surface of the arms of the radius rod 2, just above the integral plate or web 13, and bridge the triangular space adjacent the intersection of the arms 3, and a plurality of bolts 17 are placed in and through the bolt holes in the integral plate or web 13 and the detachable plate 15 of the two radius rods so that when the nuts 18 are screwed up tight on the bolts 17 the radius rods will be held securely in place one directly over the other.

I do not wish to be understood as limiting myself to the specific details of construction and arrangement as herein described and illustrated, as it is manifest that variations and modifications may be made in the features of construction and arrangement, in the adaption of the device to various conditions of use, without departing from the spirit and scope of my invention and improvements. I therefore reserve the right to all such variations and modifications as properly fall within the scope of my invention and the terms of the following claims.

What I claim is:

1. In an auxiliary radius rod, intersecting arms having an integral triangular-shaped portion or web, a detachable triangular-shaped plate and means for securing the said plate and auxiliary radius rod to an ordinary radius rod.

2. In an auxiliary radius rod, arms arranged in V-shape, a triangular-shaped reinforcement at the intersection of said arms formed integral therewith.

3. In an auxiliary radius rod, V-shaped intersecting arms having an integral substantially flat portion or web adjacent their intersection, a detachable substantially flat plate and means adjacent the corners thereof for securing said plate and auxiliary radius rod to an ordinary radius rod.

In testimony whereof I have affixed my signature.

THOMAS E. CURRY.